(12) United States Patent
Rendahl et al.

(10) Patent No.: US 9,177,132 B2
(45) Date of Patent: Nov. 3, 2015

(54) CAPTURING DATA PARAMETERS IN TEMPLATES IN A NETWORKED COMPUTING ENVIRONMENT

(75) Inventors: Randy A. Rendahl, Raleigh, NC (US); Tian Ming Pan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/271,439

(22) Filed: Oct. 12, 2011

(65) Prior Publication Data

US 2013/0097651 A1 Apr. 18, 2013

(51) Int. Cl.
G06F 21/00 (2013.01)
G06F 21/33 (2013.01)
H04L 12/24 (2006.01)
G06F 9/455 (2006.01)

(52) U.S. Cl.
CPC ............ *G06F 21/33* (2013.01); *G06F 9/45558* (2013.01); *H04L 41/08* (2013.01); *H04L 41/0803* (2013.01); *H04L 41/0806* (2013.01); *H04L 41/22* (2013.01)

(58) Field of Classification Search
CPC . H04L 41/0806; H04L 41/0843; H04L 41/22; H04L 41/0803; H04L 41/08; G06F 9/45558
USPC ................ 726/1; 709/201, 220–222
See application file for complete search history.

(56) References Cited

U.S. PATENT DOCUMENTS

| | | | |
|---|---|---|---|
| 7,774,504 B2 * | 8/2010 | Chene et al. ................... | 709/246 |
| 7,954,087 B2 | 5/2011 | Zenz et al. | |
| 8,225,371 B2 * | 7/2012 | Jones et al. ....................... | 726/1 |
| 8,543,673 B2 * | 9/2013 | Calippe et al. ................. | 709/221 |
| 2002/0099669 A1 * | 7/2002 | Lauer .............................. | 705/80 |
| 2003/0172141 A1 | 9/2003 | Miller, II et al. | |
| 2005/0086252 A1 * | 4/2005 | Jones et al. .................... | 707/102 |
| 2010/0268803 A1 * | 10/2010 | Calippee et al. .............. | 709/221 |
| 2011/0138047 A1 | 6/2011 | Brown et al. | |
| 2011/0231899 A1 * | 9/2011 | Pulier et al. ....................... | 726/1 |
| 2011/0231936 A1 * | 9/2011 | Williams et al. ................. | 726/25 |
| 2012/0216242 A1 * | 8/2012 | Uner et al. ......................... | 726/1 |
| 2013/0018994 A1 * | 1/2013 | Flavel et al. ................... | 709/220 |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

Richnas, M.., "Amazon Unveils Tools to Ease Complex Cloud Development", http://www.computerworld.com/s/article/921140/Amazon_unveils_tools_to_ease_complex_cloud_development, Feb. 25, 2011.

(Continued)

*Primary Examiner* — Linglan Edwards
(74) *Attorney, Agent, or Firm* — Noah A. Sharkan; Keohane & D'Alessandro PLLC; Maxine L. Barasch

(57) ABSTRACT

Embodiments of the present invention provide an approach for allowing a user to capture a set of values for a set of input parameters in a template that may be used for present and/or future provisioning of virtual resources. Under this approach, the template may be managed within a networked computing environment (e.g., cloud computing environment) for future use by the creating user or other authorized users. The next time the user is interacting with the environment, the set of templates available may be accessed, and the user can select/utilize a previously stored template. Once a template is chosen, the user may initiate a provisioning request from the environment's interface(s), which may include graphical user interfaces (GUIs), command lines, application programming interfaces (APIs), etc. In any event, the user may also have the opportunity to update any saved data and/or provide additional data.

19 Claims, 6 Drawing Sheets

(56) References Cited

OTHER PUBLICATIONS

York, Ed., "Creating Templates with the SoftLayer Activity Library for Citrix Workflow Studio", The Citrix Blog, http://blogs.citrix.com, Jun. 25, 2010.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

* cited by examiner

CAPTURING DATA PARAMETERS IN TEMPLATES IN A NETWORKED COMPUTING ENVIRONMENT

TECHNICAL FIELD

In general, the present invention relates to data parameter capturing. Specifically, the present invention relates to the capturing of data parameters in templates in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

As consumers begin to utilize networked computing environments (e.g., cloud computing environments), these consumers may be presented with the need to provide information. For example, when provisioning a new virtual machine, a consumer/user may have to specify a name, user identification (ID), a password, a desired operating system, resource sizing, etc. This may be required multiple times for multiple deployments or to replace a previous deployment in a consistent way.

Even as computing environments have become more complex, the initial user experience often involves the use a graphical user interface (GUI) to navigate about the computing environment. However, challenges may exist in providing support for production level configuration and deployment activities due to the potentially error-prone nature of such interfaces. For example, a user/administrator is generally responsible for properly inputting correct configuration information into the interface. Since, such an interface may include multiple panels as well as option selections, multiple opportunities for the input of erroneous configuration information may exist.

SUMMARY

In general, embodiments of the present invention provide an approach for allowing a user to capture a set of values for a set of input parameters in a template that may be used for present and/or future provisioning of virtual resources. Under this approach, the template may be managed within a networked computing environment (e.g., cloud computing environment) for future use by the creating user/administrator or other authorized users. In addition, the template (or the values therein) could be associated with one or more policies (e.g., security policies) and saved/stored in accordance therewith. For example, a security policy may require a password to be encrypted when saved in a template. Regardless, when the user is interacting with the environment in the future, the set of templates available may be accessed, and the user can select/utilize a previously stored template. Once a template is chosen, the user may initiate a provisioning request from the environment's interface(s), which may include graphical user interfaces (GUIs), command lines, application programming interfaces (APIs), etc. In any event, the user may also have the opportunity to update any saved data and/or provide additional data.

A first aspect of the present invention provides a computer-implemented method for capturing data parameters in templates in a networked computing environment, comprising: receiving, in a computer memory medium, an initial request to provision at least one virtual resource in the networked computing environment; receiving a set of values for a set of input parameters from a requester of the initial request; receiving an indication that the set of values are to be saved in a template; evaluating each of the set of values to determine whether a set of policies applies to the set of values; applying the set of policies based on the evaluating; and saving the set of values as a template pursuant to the application of the set of policies.

A second aspect of the present invention provides a system for capturing data parameters in templates in a networked computing environment, comprising: a memory medium comprising instructions; a bus coupled to the memory medium; and a processor coupled to the bus that when executing the instructions causes the system to: receive in a computer memory medium, an initial request to provision at least one virtual resource in the networked computing environment; receive a set of values for a set of input parameters from a requester of the initial request; receive an indication that the set of values are to be saved in a template; evaluate each of the set of values to determine whether a set of policies applies to the set of values; apply the set of policies based on the evaluating; and save the set of values as a template pursuant to the application of the set of policies.

A third aspect of the present invention provides a computer program product for capturing data parameters in templates in a networked computing environment, the computer program product comprising a computer readable storage media, and program instructions stored on the computer readable storage media, to: receive, in a computer memory medium, an initial request to provision at least one virtual resource in the networked computing environment; receive a set of values for a set of input parameters from a requester of the initial request; receive an indication that the set of values are to be saved in a template; evaluate each of the set of values to determine whether a set of policies applies to the set of values; apply the set of policies based on the evaluating; and save the set of values as a template pursuant to the application of the set of policies.

A fourth aspect of the present invention provides a method for deploying a system for capturing data parameters in templates in a networked computing environment, comprising: providing a computer infrastructure being operable to: receive in a computer memory medium, an initial request to provision at least one virtual resource in the networked computing environment; receive a set of values for a set of input parameters from a requester of the initial request; receive an indication that the set of values are to be saved in a template; evaluate each of the set of values to determine whether a set of policies applies to the set of values; apply the set of policies based on the evaluating; and save the set of values as a template pursuant to the application of the set of policies.

BRIEF DESCRIPTION OF THE DRAWINGS

These and other features of this invention will be more readily understood from the following detailed description of the various aspects of the invention taken in conjunction with the accompanying drawings in which.

Figure 1:
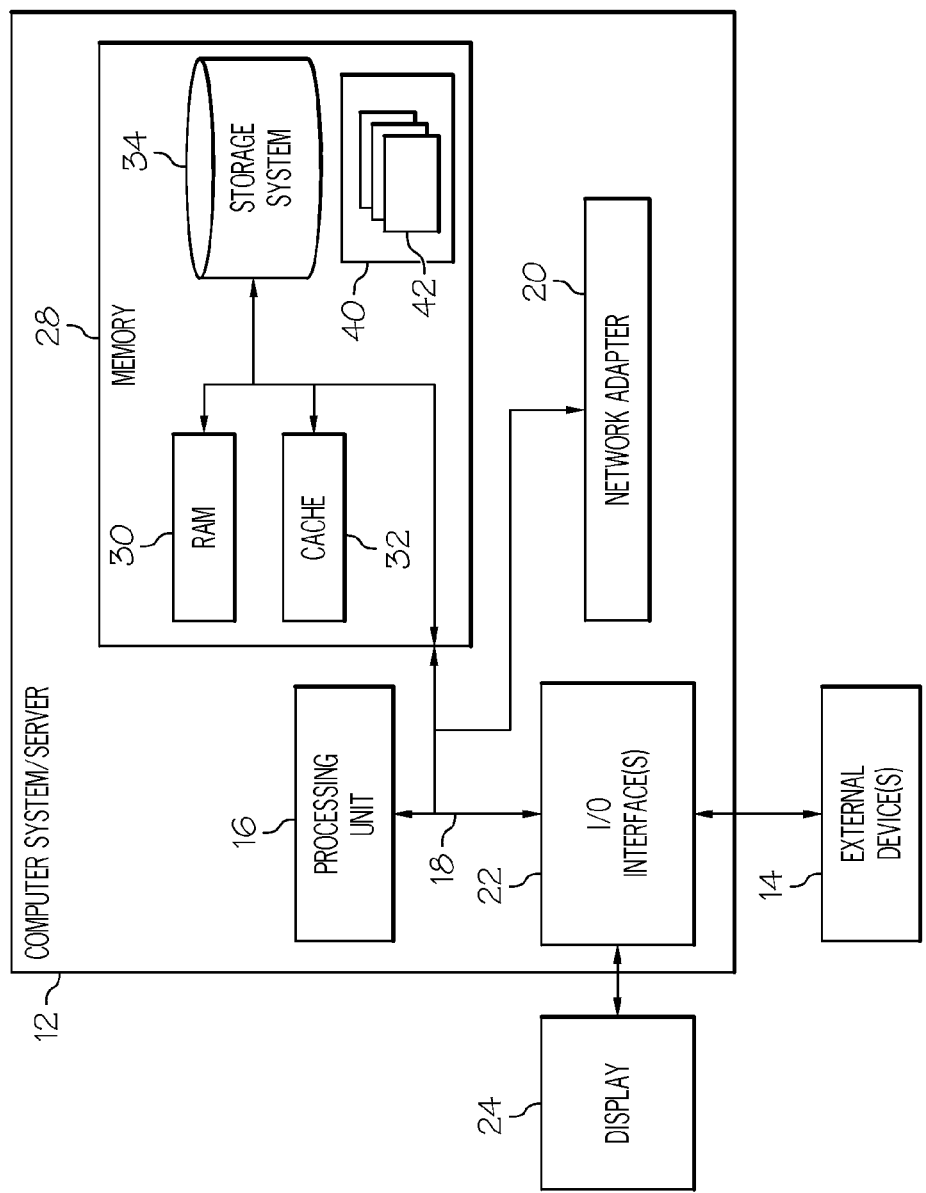
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for allowing a user to capture a set of values for a set of input parameters in a template that may be used for present and/or future provisioning of virtual resources. Under this approach, the template may be managed within a networked computing environment (e.g., cloud computing environment) for future use by the creating user or other authorized users. In addition, the template (or the values therein) could be associated with one or more policies (e.g., security policies) and saved/stored in accordance therewith. For example, a security policy may require a password to be encrypted when saved in a template. Regardless, the next time the user is interacting with the environment, the set of templates available may be accessed, and the user can select/utilize a previously stored template. Once a template is chosen, the user may initiate a provisioning request from the environment's interface(s), which may include graphical user interfaces (GUIs), command lines, application programming interfaces (APIs), etc. In any event, the user may also have the opportunity to update any saved data and/or provide additional data.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
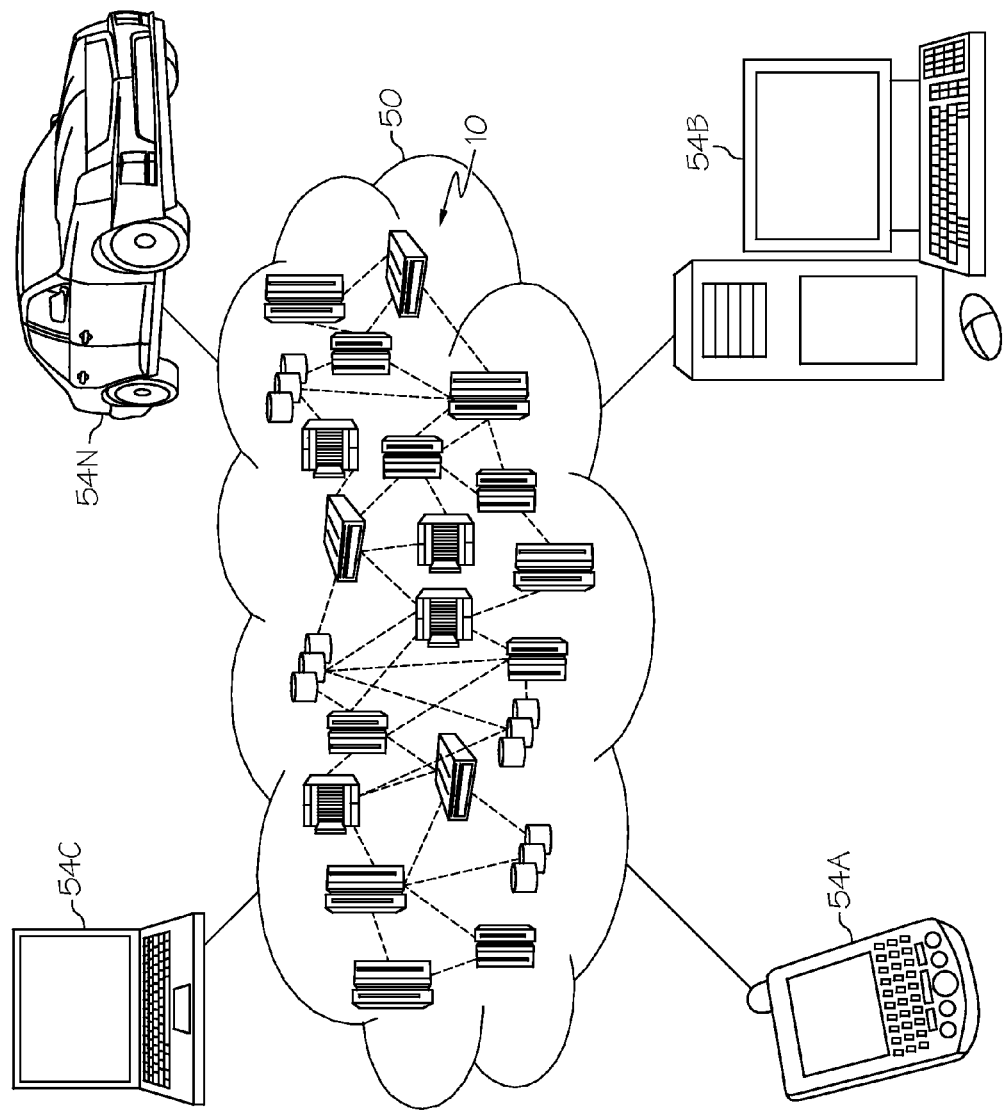
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
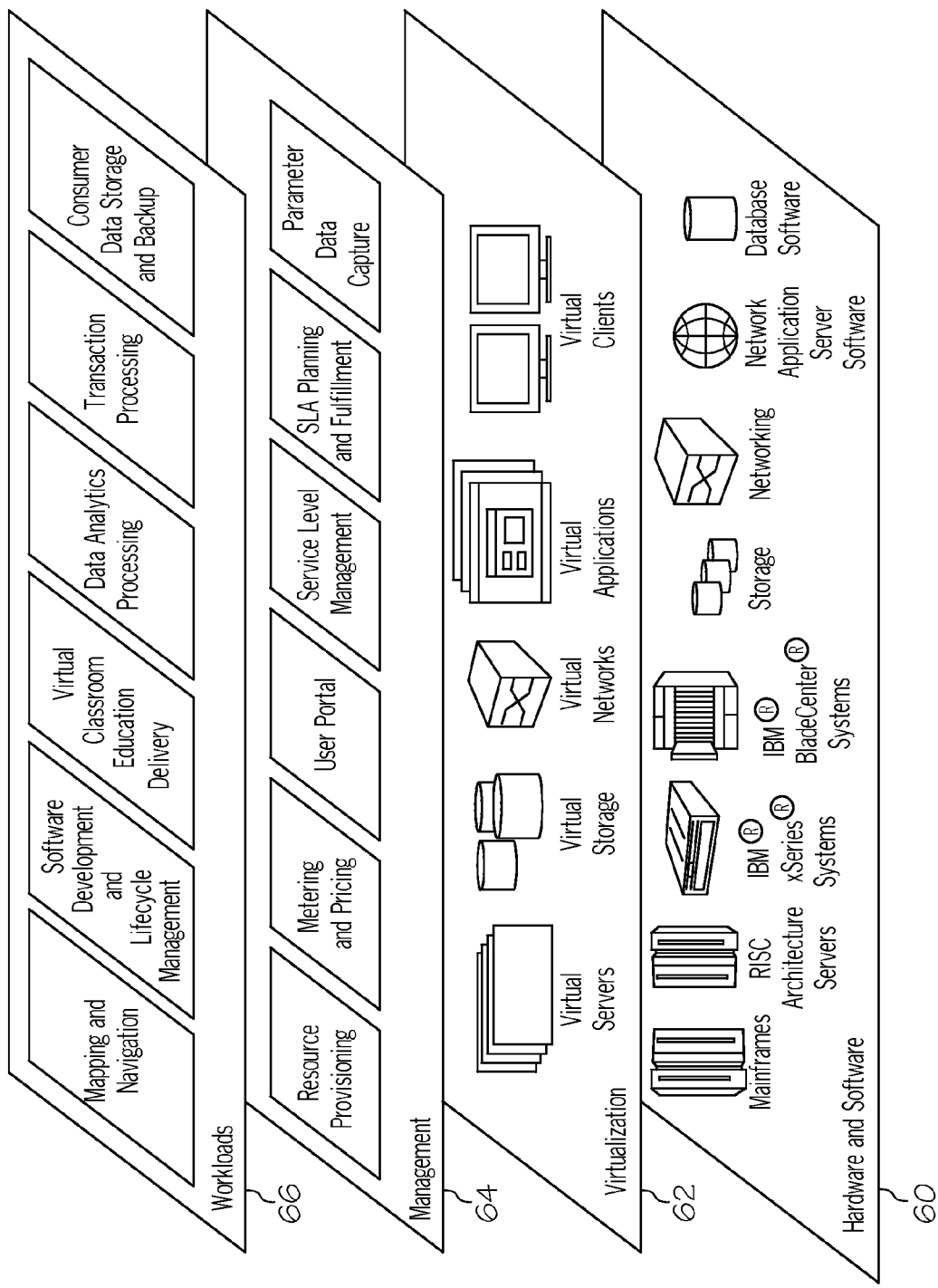
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is parameter data capture, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the parameter data capture functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
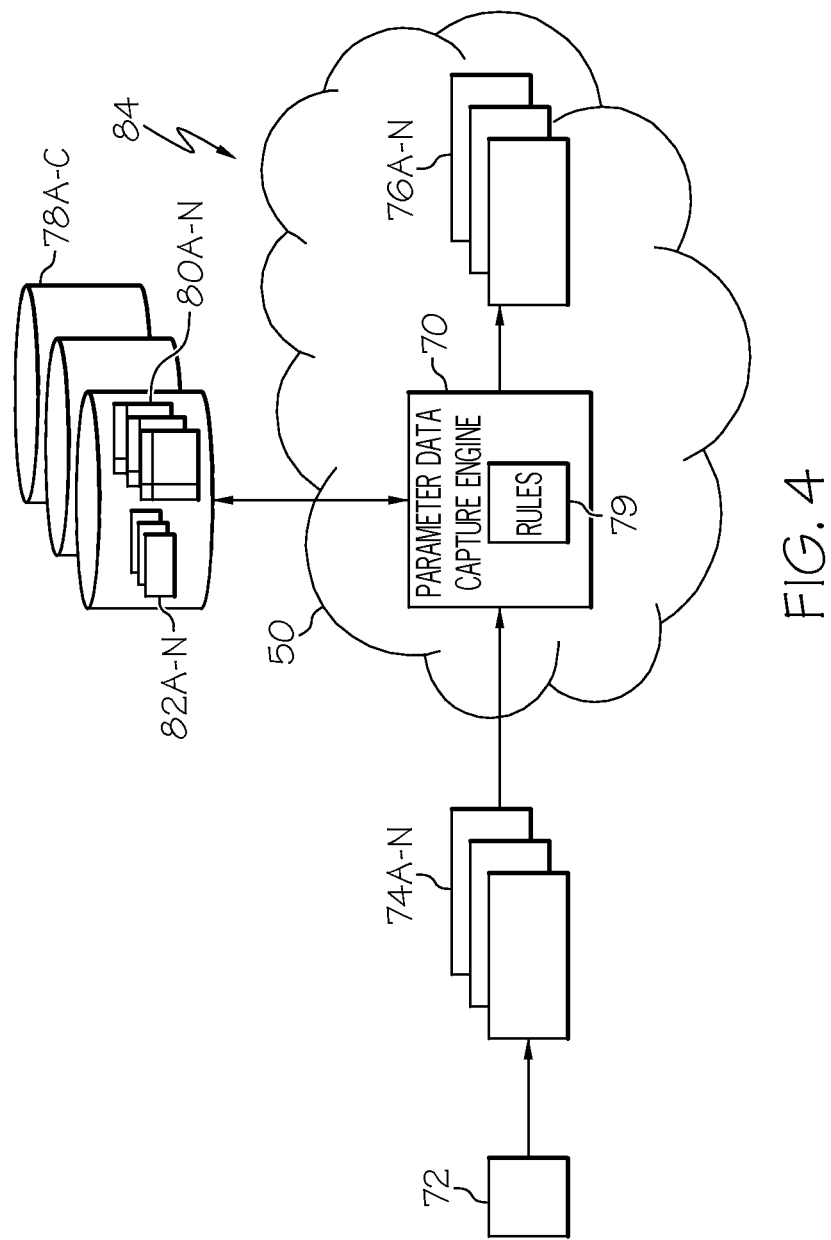
FIG. 4 depicts a system diagram according to an embodiment of the present invention.

Referring now to FIG. 4, a system diagram according to an aspect of the present invention is shown. As depicted, a parameter data capture engine (engine 70) is shown within networked computing environment 84 (e.g., comprising cloud computing environment 50). In general, engine 70 can be implemented as program 40 on computer system 12 of FIG. 1 and can implement the functions recited herein as depicted in management layer 64 of FIG. 3. In general, engine 70 (in one embodiment) comprises a rules and/or computational engine that processes a set (at least one) of rules 79 and/or performs computations to capture input/data parameters/values as a template or the like.

Along these lines, engine 70 may perform multiple functions similar to a general-purpose computer using rules 79. Specifically, among other functions, engine 70 may: receive, in a computer memory medium, an initial request to provision at least one virtual resource in the networked computing environment 84 (which may comprise a cloud computing environment 50 or the like); receive a set of input parameters 74A-N from a requester 72 of the initial request; receive an indication that the set of input parameters 74A-N are to be saved in a template; evaluate each of the set of input parameters to determine a whether a set of policies 82A-N (e.g., a security policy) apply to the set of input parameters 74A-BN; apply the set of policies 82A-N based on the evaluating (e.g., encrypt or remove any inputted passwords); save/store the set in input parameters 74A-N as one or more templates 80A-N (e.g., in a set of database 82A-N or the like) pursuant to the application of the set of policies 82A-N; and/or provision one or more virtual resources 76A-N using the template(s) 80A-N pursuant to the request.

This allows template(s) 80A-N to be selected to fulfill future provisioning requests. For example, engine 70 could further: receive a subsequent request to provision the virtual resource from the requester (or another requester/authorized user of template(s) 80A-N); present the requester with a set of templates 80A-N; receive a selection of the template from the set of templates by the requester; and/or provision the at least one virtual resource using the set of input parameters in the template.

In general, these features can be provided/implemented via any type of interface such as APIs, command Line, GUIs, etc. Through the use of user defined parameter definitions (e.g., extensible markup language (XML) for virtual resource image launching, etc), the template-based data capture described herein may be extensible beyond hard coded parameters known within the environment's code. Along these lines, the overall approach generally comprises the definition of the parameter sets in meta-data describing both the parameter and any contextual information (e.g., using XML to capture the information), providing a policy model that can be applied against parameters to determine data capture actions (such as encrypt, do not save, randomize, etc.). This approach may allow a user to request the creation of an input template from the data provided, and storing the input data in a typed and named template. This approach may further render templates available for selection and reuse in later requests (e.g., from all input interfaces such as UI, API, and Command Line).

Figure 5:
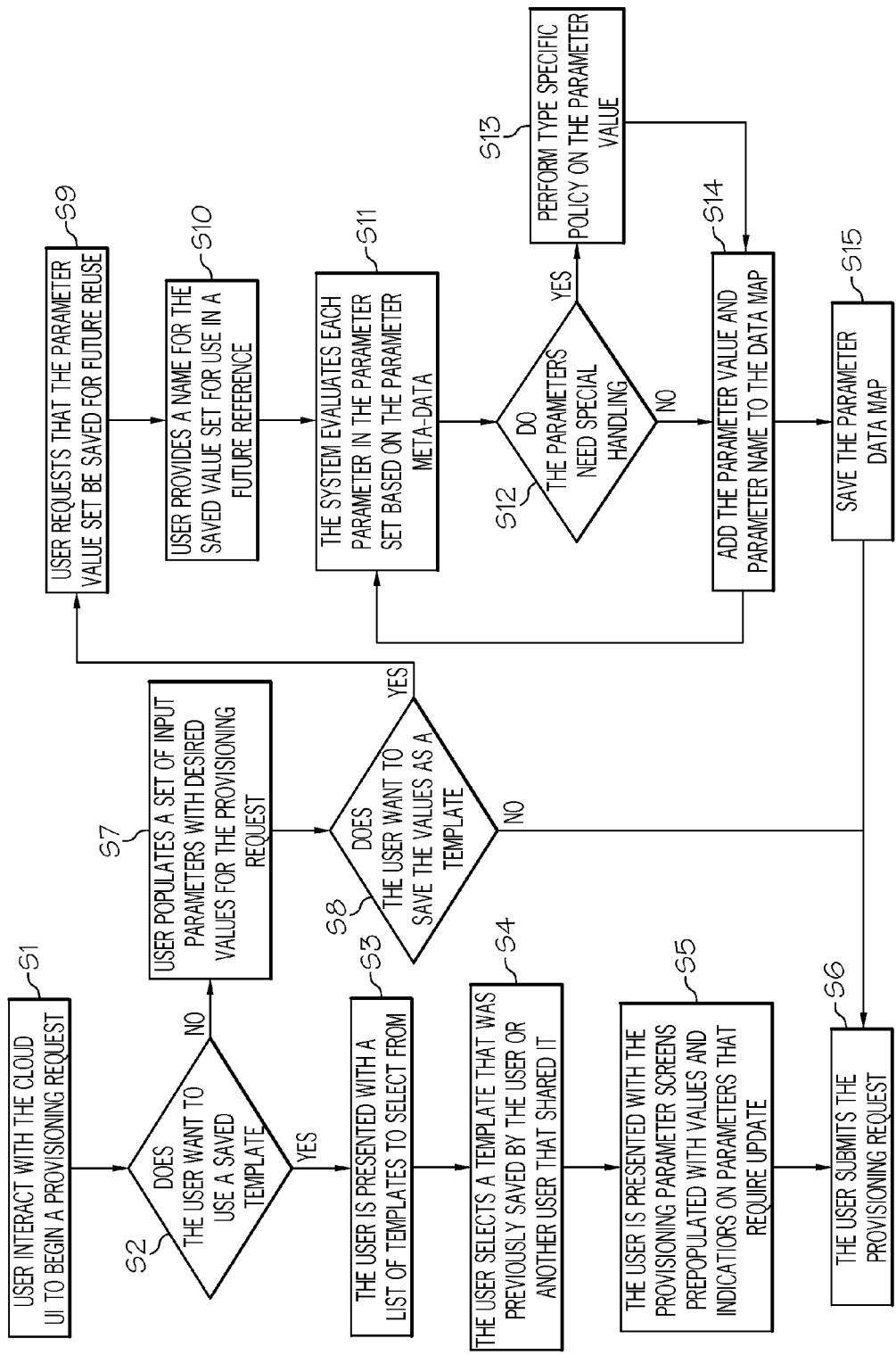
FIG. 5 depicts a method flow diagram according to an embodiment of the present invention.

Referring now to FIG. 5, a method flow diagram according to an embodiment of the present invention is shown. It is understood in advance that the flow diagram in FIG. 5 is with specific reference to a cloud computing environment (also referred to as cloud). However, it should be understood that similar teachings could be practiced in conjunction with any type of networked computing environment. In step S1, a user/requester interacts with a cloud user interface (UI) to begin a provisioning request. In step S2, it is determined whether the user wishes to utilize a saved template. If so, the user is presented with a list of templates in step S3. In step S4, the user selected a template from the list (e.g., previously saved by that user or another user that "shared" the template). In step S5, the user is presented with a provisioning parameters screen with indicators for any input parameters that need updating. In step S6 (after any needed parameters have been updated), the user submits the provisioning request.

If, in step S2, it is determined that the user does not wish to utilize a saved template, the user will populate a set of input parameters with desired values for the provisioning request in step S7. In step S8, it is determined whether the user wishes to save the values as a template. If not, the provisioning request is submitted in step S6. However, if the user does wish to have the parameters/values stored as a template, the user will request as much in step S9. Then, in step S10, the user will provide a name for the value set. In step S11, each parameter will be evaluated based on its meta data, and in step S12, it will be determined whether any parameter has "special" meaning (e.g., have an applicable policy) and therefore require special handling. If so, the applicable policy is applied to the parameter value in step S13 (e.g., a password can be encrypted, a hypertext link/address may be resolved, etc.). Then, in step S14, the parameter value and associated name is added to the data map, which is saved in step S15. Thereafter, the "template" can be submitted in conjunction with the provisioning request in step S6.

Figure 6:
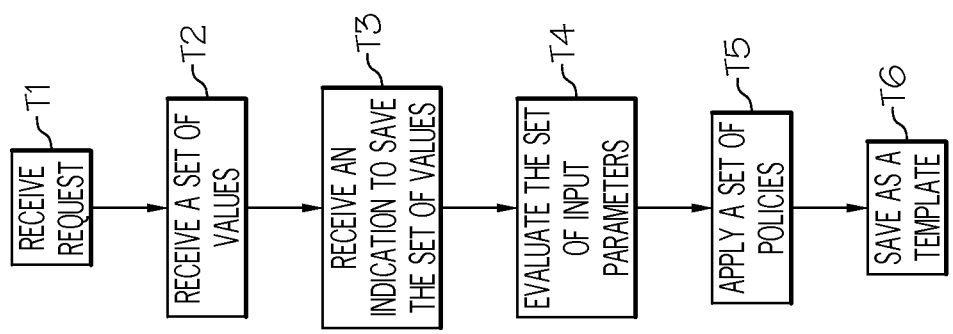
FIG. 6 depicts another method diagram according to an embodiment of the present invention.

Referring now to FIG. 6, another method flow diagram according to an embodiment of the present invention is shown. As depicted, in step T1, an initial request to provision at least one virtual resource in the networked computing environment is received in a computer memory medium. In step T2, a set of values for a set of input parameters is received from a requester of the initial request. In step T3 an indication that the set of values are to be saved in a template is received (e.g., from the requester). In step T4, each of the set of values is evaluated to determine whether a set of policies applies to the set of values. In step T5, the set of policies is applied based on the evaluating. In step T6, the set of values is saved as a template pursuant to the application of the set of policies.

While shown and described herein as a parameter data capturing solution, it is understood that the invention further provides various alternative embodiments. For example, in one embodiment, the invention provides a computer-readable/useable medium that includes computer program code to enable a computer infrastructure to provide parameter data capturing functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide parameter data capturing functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for parameter data capturing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for capturing data parameters in templates in a networked computing environment, comprising:
    receiving, in a computer memory medium, an initial request from a first requester to provision at least one virtual resource in the networked computing environment;
    receiving a set of values for a set of input parameters from first requester;
    receiving an indication that the set of values are to be saved in a template for provisioning by a second requester;
    evaluating each of the set of values to determine whether a set of policies applies to the set of values, the set of policies comprising at least one security policy;
    applying the set of policies to the set of values based on the evaluating;
    determining, based on the applying of the set of policies, at least one data capture action of a plurality of data capture actions, said plurality of data capturing actions comprising encrypt, do not save, and randomize;
    saving the set of values, according to the at least one determined data capture action, as a typed and named template for provisioning the template by a second requester;
    receiving a subsequent request, using the template name, from the second requester to provision the virtual resource;
    presenting the second requester with a set of templates;
    receiving a selection of the template from the set of templates by the second requester; and
    provisioning the at least one virtual resource using the set of values in the template.

2. The computer-implemented method of claim 1, the saving comprising mapping the set of values to a corresponding set of fields in the template.

3. The computer-implemented method of claim 1, further comprising encrypting a password received as one of the set of values based on the at least one security policy.

4. The computer-implemented method of claim 1, the networked computing environment, comprising a cloud computing environment.

5. The computer-implemented method of claim 1, further comprising:
    utilizing the template as input; and
    provisioning the at least one virtual resource using the template.

6. The computer-implemented method of claim 1, the requester being one of a set of authorized users of the template.

7. A system for capturing data parameters in templates in a networked computing environment, comprising:
    a memory medium comprising instructions;
    a bus coupled to the memory medium; and
    a processor coupled to the bus that when executing the instructions causes the system to:
        receive in a computer memory medium, an initial request from a first requester to provision at least one virtual resource in the networked computing environment;
        receive a set of values for a set of input parameters from first requester;
        receive an indication that the set of values are to be saved in a template for provisioning by a second requester;
        evaluate each of the set of values to determine whether a set of policies applies to the set of values, the set of policies comprising at least one security policy;
        apply the set of policies to the set of values based on the evaluating;
        determine, based on the applying of the set of policies, at least one data capture action of a plurality of data capture actions, said plurality of data capturing actions comprising encrypt, do not save, and randomize;
        save the set of values, according to the determined at least one data capture action, as a typed and named template for provisioning the template by a second requester;
        receive a subsequent request, using the template name, from the second requester to provision the virtual resource;
        present the second requester with a set of templates;
        receive a selection of the template from the set of templates by the second requester; and
        provision the at least one virtual resource using the set of values in the template.

8. The system of claim 7, the memory medium further comprising instructions for causing the system to map the set of values to a corresponding set of fields in the template.

9. The system of claim 7, the memory medium further comprising instructions for causing the system to encrypt a password received as one of the set of values based on the at least one security policy.

10. The system of claim 7, the networked computing environment, comprising a cloud computing environment.

11. The system of claim 7, the memory medium further comprising instructions for causing the system to:
   utilize the template as input; and
   provision the at least one virtual resource using the template.

12. The system of claim 7, the requester being one of a set of authorized users of the template.

13. A computer program product for capturing data parameters in templates in a networked computing environment, the computer program product comprising a computer readable storage device, and program instructions stored on the computer readable storage device, to:
   receive, in a computer memory medium, an initial request from a first requester to provision at least one virtual resource in the networked computing environment;
   receive a set of values for a set of input parameters from the first requester;
   receive an indication that the set of values are to be saved in a template for provisioning by a second requester;
   evaluate each of the set of values to determine whether a set of policies applies to the set of values, the set of policies comprising at least one security policy;
   apply the set of policies to the set of values based on the evaluating;
   determine, based on the applying of the set of policies, at least one data capture action of a plurality of data capture actions, said plurality of data capture actions comprising encrypt, do not save, and randomize;
   save the set of values, according to the determined at least one data capture action, as a typed and named template for provisioning the template by a second requester;
   receive a subsequent request, using the template name, from the second requester to provision the virtual resource;
   present the second requester with a set of templates;
   receive a selection of the template from the set of templates by the second requester; and
   provision the at least one virtual resource using the set of values in the template.

14. The computer program product of claim 13, the computer readable storage device further comprising instructions to map the set of values to a corresponding set of fields in the template.

15. The computer program product of claim 13, the computer readable storage device further comprising instructions to encrypt a password received as one of the set of values based on the at least one security policy.

16. The computer program product of claim 13, the networked computing environment, comprising a cloud computing environment.

17. The computer program product of claim 13, the computer readable storage device further comprising instructions to:
   utilize the template as input; and
   provision the at least one virtual resource using the template.

18. The computer program product of claim 13, the requester being one of a set of authorized users of the template.

19. A method for deploying a system for capturing data parameters in templates in a networked computing environment, comprising:
   providing a computer infrastructure that operates to:
      receive in a computer memory medium, an initial request from a first requester to provision at least one virtual resource in the networked computing environment;
      receive a set of values for a set of input parameters from the first requester;
      receive an indication that the set of values are to be saved in a template for provisioning by a second requester;
      evaluate each of the set of values to determine whether a set of policies applies to the set of values, the set of policies comprising at least one security policy;
      apply the set of policies to the set of values based on the evaluating;
      determine, based on the applying of the set of policies, at least one data capture action of a plurality of data capture actions, said plurality of data capture actions comprising encrypt, do not save, and randomize;
      save the set of values, according to the determined at least one data capture action, as a typed and named template for provisioning the template by a second requester;
      receive a subsequent request, using the template name, from the second requester to provision the virtual resource;
      present the second requester with a set of templates;
      receive a selection of the template from the set of templates by the second requester; and
      provision the at least one virtual resource using the set of values in the template.

* * * * *